(12) United States Patent
Cosher

(10) Patent No.: US 12,372,313 B2
(45) Date of Patent: Jul. 29, 2025

(54) VARIABLE PASSAGES TO OPTIMIZE DELTA P AND HEAT TRANSFER ALONG FLOW PATH

(71) Applicant: Raytheon Technologies Corporation, Farmington, CT (US)

(72) Inventor: Christopher Ryan Cosher, Vernon, CT (US)

(73) Assignee: RTX Corporation, Farmington, CT (US)

(*) Notice: Subject to any disclaimer, the term of this patent is extended or adjusted under 35 U.S.C. 154(b) by 221 days.

(21) Appl. No.: 18/081,909

(22) Filed: Dec. 15, 2022

(65) Prior Publication Data
US 2024/0200887 A1    Jun. 20, 2024

(51) Int. Cl.
  *F28F 3/02*     (2006.01)
  *F28F 1/02*     (2006.01)
  *F28F 1/40*     (2006.01)

(52) U.S. Cl.
  CPC ............. *F28F 3/027* (2013.01); *F28F 1/022* (2013.01); *F28F 1/40* (2013.01); *F28F 2215/00* (2013.01)

(58) Field of Classification Search
  CPC .. F28F 1/025; F28F 3/048; F28F 1/022; F28F 1/40; F28F 3/027; F28F 2215/00
  See application file for complete search history.

(56) References Cited

U.S. PATENT DOCUMENTS

| | | | | |
|---|---|---|---|---|
| 2,488,615 | A * | 11/1949 | Arnold | F28F 13/12 138/38 |
| 2,912,749 | A * | 11/1959 | Huggins | F28D 1/0391 29/890.039 |
| 3,750,709 | A * | 8/1973 | French | B21C 37/202 138/38 |
| 5,099,576 | A * | 3/1992 | Shinmura | F28F 1/025 165/173 |
| 5,184,672 | A * | 2/1993 | Aoki | F28F 13/12 138/38 |
| 5,586,598 | A * | 12/1996 | Tanaka | F28F 1/40 165/177 |

(Continued)

FOREIGN PATENT DOCUMENTS

| | | | |
|---|---|---|---|
| JP | H08178568 A | 7/1996 | |
| WO | WO-2013187435 A1 * | 12/2013 | F28F 1/02 |

OTHER PUBLICATIONS

Extended European Search Report for counterpart EP application No. 23215308 dated May 16, 2024.

*Primary Examiner* — Nelson J Nieves
(74) *Attorney, Agent, or Firm* — Bachman & LaPointe, P.C.

(57) ABSTRACT

A heat exchanger including an internal passage extending from a first inlet end to a first outlet end; a first longitudinal length extending from the first inlet end to the first outlet end; an inner surface of the passage including a first augmentation feature disposed along the first longitudinal length across the inner surface; an outer surface extending from a second inlet end to a second outlet end, the outer surface being in heat transfer communication with the inner surface; and a first region including portions of both the inner surface and the outer surface adjacent at least a portion of the first inlet end, wherein the first augmentation feature varies a cross-sectional area in a direction along the first longitudinal length and within the first region.

14 Claims, 4 Drawing Sheets

(56) References Cited

U.S. PATENT DOCUMENTS

| | | | | |
|---|---|---|---|---|
| 5,826,646 A | * | 10/1998 | Bae | F28F 3/04 165/110 |
| 5,884,691 A | * | 3/1999 | Batchelder | H05K 7/20154 257/722 |
| 10,823,511 B2 | * | 11/2020 | Vargas | F28F 1/16 |
| 10,907,500 B2 | | 2/2021 | Wong et al. | |
| 11,391,523 B2 | | 7/2022 | Stillman et al. | |
| 2005/0087326 A1 | * | 4/2005 | Barmoav | F28F 3/048 257/E23.102 |
| 2005/0224333 A1 | * | 10/2005 | Saifutdinov | B01D 1/065 202/160 |
| 2011/0000657 A1 | * | 1/2011 | Ruckwied | F28F 1/022 165/181 |
| 2011/0108253 A1 | * | 5/2011 | Cool | F24H 1/41 165/151 |
| 2015/0075758 A1 | * | 3/2015 | Ishimaru | F28F 21/06 165/167 |
| 2016/0036104 A1 | | 2/2016 | Kenney et al. | |
| 2016/0138874 A1 | * | 5/2016 | Downing | F28B 1/00 165/166 |
| 2016/0290688 A1 | * | 10/2016 | Kusuda | F28F 1/006 |
| 2016/0327346 A1 | * | 11/2016 | Dziubinschi | F28F 13/12 |
| 2017/0051988 A1 | * | 2/2017 | Dziubinschi | F28F 1/06 |
| 2017/0184060 A1 | * | 6/2017 | Cho | F28F 3/025 |
| 2017/0205149 A1 | * | 7/2017 | Herring | B23P 15/26 |
| 2019/0170445 A1 | | 6/2019 | McCaffrey | |
| 2019/0293366 A1 | * | 9/2019 | Disori | F28F 9/02 |
| 2019/0293367 A1 | * | 9/2019 | Stillman | F28F 3/048 |
| 2019/0310030 A1 | * | 10/2019 | Disori | F28F 3/06 |
| 2020/0018494 A1 | * | 1/2020 | Yatsuyanagi | F28F 1/32 |
| 2021/0018276 A1 | * | 1/2021 | Reinhardt | B21D 13/04 |
| 2021/0123690 A1 | | 4/2021 | Iwasaki et al. | |
| 2021/0148638 A1 | * | 5/2021 | Disori | F28F 9/013 |
| 2022/0087053 A1 | * | 3/2022 | Pan | F28F 13/187 |
| 2024/0035756 A1 | * | 2/2024 | Belzowski | F28D 9/0031 |

* cited by examiner

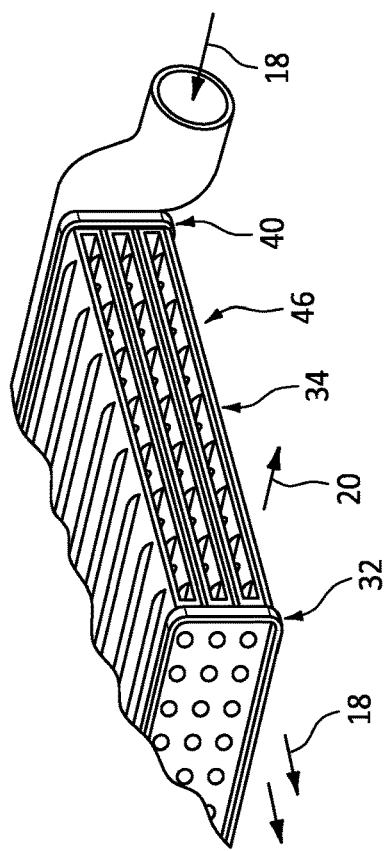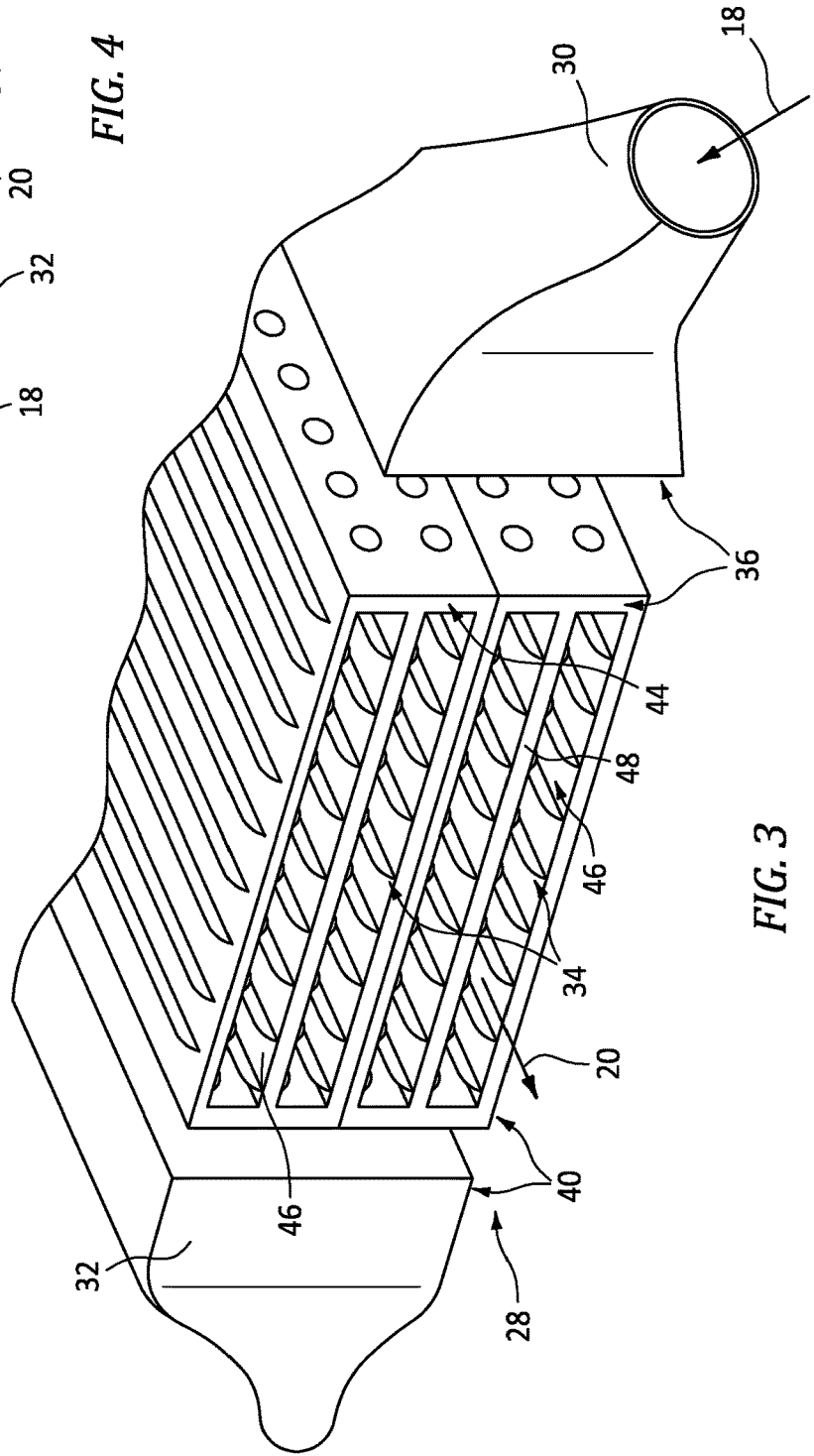
FIG. 4
FIG. 3

VARIABLE PASSAGES TO OPTIMIZE DELTA P AND HEAT TRANSFER ALONG FLOW PATH

BACKGROUND

The present disclosure is directed to the improved a modification of heat exchanger flow passages to optimize the heat transfer across the flow path of the heat exchanger. Particularly the modification can include modification of the cross-sectional flow area along the flow passage in order to influence the heat transfer coefficient with the goal of maintaining a consistent heat transfer profile across the entire heat exchanger.

Heat exchangers include multiple flow passages consisting of a cross sectional area and surfaces that contact the working fluids flowing through the flow passages. Typically, the heat exchanger will operate with a heat exchanger heat transfer profile that is non-uniform across the heat exchanger. As the two working fluids pass through the heat exchanger the hotter working fluid transfers thermal energy to the colder working fluid. As this transfer takes place across the heat exchanger the two working fluid temperatures tend to converge. In regions of the heat exchanger where the delta T between the two working fluids is higher the heat transfer coefficient can be higher as opposed to other regions of the heat exchanger where the delta T between the two working fluids is lower and resultant heat transfer coefficient h is lower, assuming similar surfaces and flow area and flow velocities. $Q=hA(T_{avg}-T_{hot})$ For example, a plate fin heat exchanger includes adjacent flow paths that transfer heat from a hot flow to a cooling flow. The flow paths are defined by a combination of plates and fins that are arranged to transfer heat from one flow to another flow. The plates and fins are created from sheet metal material brazed together to define the different flow paths. Thermal gradients present in the sheet material create stresses that can be very high in certain locations. The stresses are typically largest in one corner where the hot side flow first meets the coldest portion of the cooling flow. In an opposite corner where the coldest hot side flow meets the hottest cold side flow the temperature difference is much less resulting in unbalanced stresses across the heat exchanger structure. Increasing temperatures and pressures can result in stresses on the structure that can exceed material and assembly capabilities.

Prior solutions for improving heat transfer coefficient in the heat exchanger includes the traditional HEX plate trip strips A universally employed along the flow passages B, as seen in FIG. 1. The trip strips A improve the flow characteristics of the working fluid across the surface of the heat exchanger and thus improve the heat transfer coefficient.

The non-uniform heat transfer Q can result in thermal gradients that impacts structural integrity over the heat exchanger life.

What is needed is an improved heat exchanger heat transfer profile that is more uniform across the entire heat exchanger.

SUMMARY

In accordance with the present disclosure, there is provided a heat exchanger comprising an internal passage extending from a first inlet end to a first outlet end; a first longitudinal length extending from the first inlet end to the first outlet end; an inner surface of the passage including a first augmentation feature disposed along the first longitudinal length across the inner surface; an outer surface extending from a second inlet end to a second outlet end, the outer surface being in heat transfer communication with the inner surface; and a first region including portions of both the inner surface and the outer surface adjacent at least a portion of the first inlet end, wherein the first augmentation feature varies a cross-sectional area in a direction along the first longitudinal length and within the first region.

A further embodiment of any of the foregoing embodiments may additionally and/or alternatively include the heat exchanger further comprising a second longitudinal length disposed transverse to the first longitudinal length and extending from the second inlet end to the second outlet end; a second augmentation feature disposed transverse to the first augmentation feature.

A further embodiment of any of the foregoing embodiments may additionally and/or alternatively include the cross-sectional area formed by the second augmentation feature is one of greater than or less than or equal to the cross-sectional area formed by the first augmentation feature.

A further embodiment of any of the foregoing embodiments may additionally and/or alternatively include the outer surface is disposed to provide for exposure to a cooling flow and the inner surface is disposed to provide for exposure to a hot flow.

A further embodiment of any of the foregoing embodiments may additionally and/or alternatively include the first augmentation feature extends along the entire first longitudinal length.

A further embodiment of any of the foregoing embodiments may additionally and/or alternatively include the first augmentation feature extends along a portion of the first longitudinal length.

A further embodiment of any of the foregoing embodiments may additionally and/or alternatively include the second augmentation feature extends along the entire second longitudinal length.

A further embodiment of any of the foregoing embodiments may additionally and/or alternatively include the first augmentation feature extends along a portion of the first longitudinal length.

A further embodiment of any of the foregoing embodiments may additionally and/or alternatively include the first region is disposed adjacent a joint between a plate heat exchanger and a manifold.

A further embodiment of any of the foregoing embodiments may additionally and/or alternatively include the inner surface comprises internal walls separating a plurality of passages for a hot flow.

A further embodiment of any of the foregoing embodiments may additionally and/or alternatively include the first augmentation feature is formed as an integral part of the inner surface.

A further embodiment of any of the foregoing embodiments may additionally and/or alternatively include the second augmentation feature is formed as an integral part of the outer surface.

A further embodiment of any of the foregoing embodiments may additionally and/or alternatively include the first augmentation feature is not disposed within the first region.

In accordance with the present disclosure, there is provided a process for controlling the thermal expansion of a heat exchanger comprising extending an internal passage from a first inlet end to a first outlet end; extending a first longitudinal length from the first inlet end to the first outlet end; disposing a first augmentation feature along the first longitudinal length across an inner surface of the passage; forming an outer surface extending from a second inlet end to a second outlet end, the outer surface being in heat transfer communication with the inner surface; forming a first region including portions of both the inner surface and the outer surface adjacent at least a portion of the first inlet end; and varying a cross-sectional area in a direction along the first longitudinal length and within the first region by use of the first augmentation feature.

A further embodiment of any of the foregoing embodiments may additionally and/or alternatively include the process further comprising forming a second longitudinal length transverse to the first longitudinal length and extending from the second inlet end to the second outlet end; and disposing a second augmentation feature transverse to the first augmentation feature.

A further embodiment of any of the foregoing embodiments may additionally and/or alternatively include the cross-sectional area formed by the second augmentation feature is one of greater than or less than or equal to the cross-sectional area formed by the first augmentation feature.

A further embodiment of any of the foregoing embodiments may additionally and/or alternatively include the first augmentation feature extends along the entire first longitudinal length.

A further embodiment of any of the foregoing embodiments may additionally and/or alternatively include the process further comprising exposing the outer surface to a cooling flow and the inner surface to a hot flow.

A further embodiment of any of the foregoing embodiments may additionally and/or alternatively include the process further comprising disposing the first region adjacent a joint between a plate heat exchanger and a manifold.

A further embodiment of any of the foregoing embodiments may additionally and/or alternatively include the process further comprising forming the first augmentation feature as an integral part of the inner surface.

Other details of the exemplary heat exchanger are set forth in the following detailed description and the accompanying drawings wherein like reference numerals depict like elements.

BRIEF DESCRIPTION OF THE DRAWINGS

FIG. 3 is an exploded view of another exemplary heat exchanger assembly.

FIG. 4 is a perspective view of a portion of the exemplary heat exchanger assembly.

DETAILED DESCRIPTION

Figure 1:
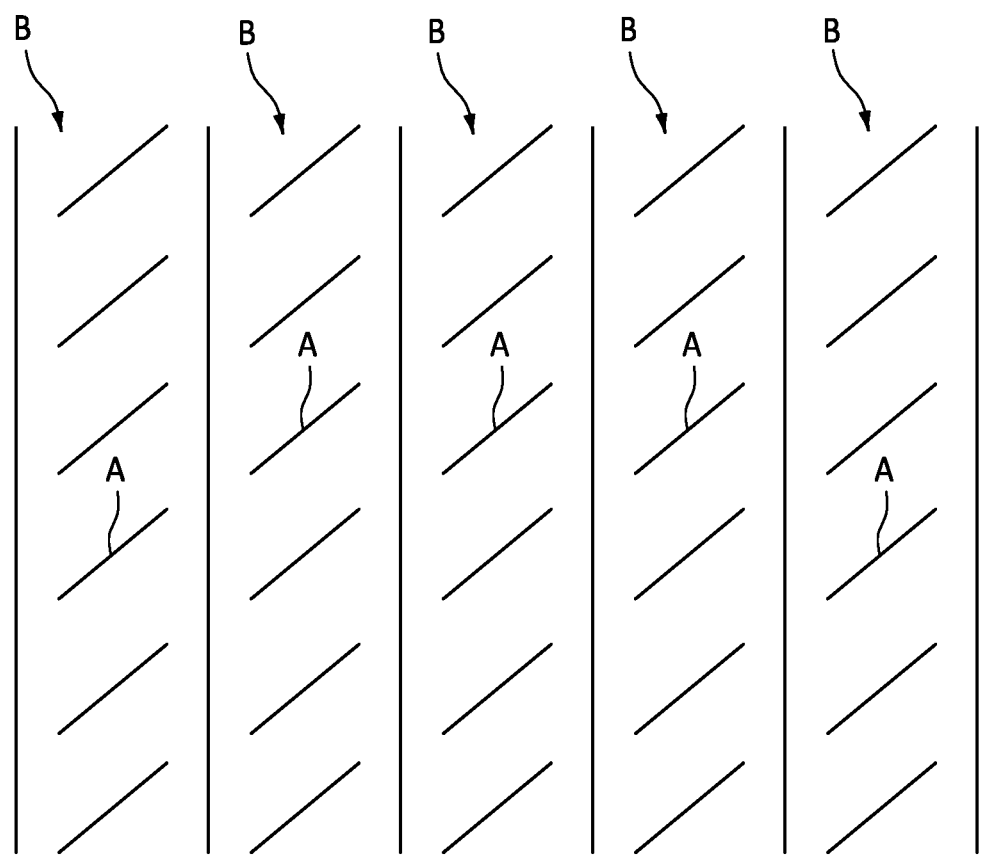
FIG. 1 is a schematic of a traditional heat exchanger with trip strips uniformly distributed.
Figure 2:
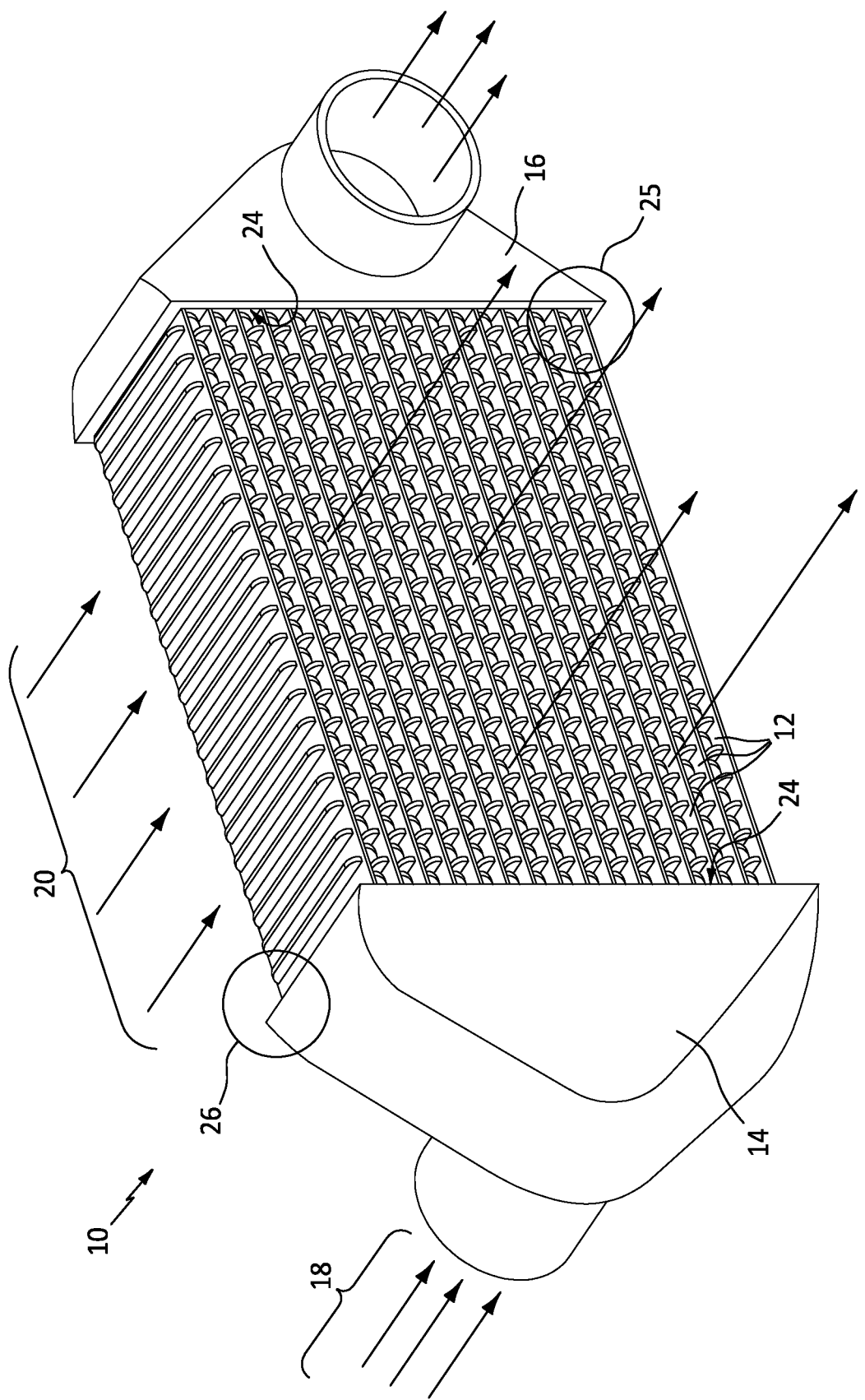
FIG. 2 is a perspective view of an exemplary heat exchanger assembly.

Referring to FIG. 2, an example heat exchanger is schematically shown and indicated at 10 and includes a plurality of plates 12 disposed between an inlet manifold 14 and an outlet manifold 16. Each of the plates 12 include internal passages for working fluid hot airflow 18 and external surfaces exposed to a working fluid cooling airflow 20. The plates 12 are one single unitary part that is either cast or formed using other manufacturing techniques, such as additive manufacturing, that provide a one piece part. The plates 12 are secured to the inlet manifold 14 at a first joint 22 and to the outlet manifold 16 at a second joint 24. The joints 22 and 24 are exposed to differences in temperature between the cooling airflow 20 and the hot airflow 18.

In the exemplary heat exchanger 10 a high temperature gradient area schematically shown at 26 is located at a position where the coolest of the cooling airflow 20 meets the hottest of the hot flow 18. In the area 26, a thermal gradient between cooling airflow 20 and hot airflow within the plates 12 is at its greatest. In contrast, an opposite corner 25 wherein the hottest of the cooling airflow 20 and the coolest of the hot flow 18 meet generates the smallest thermal gradient. The difference in thermal gradients within the areas 26 and 25 can create stresses within the joints 22 and 24.

Referring also to FIGS. 3 and 4 with continued reference to FIG. 2, another heat exchanger assembly 28 is schematically shown and includes a plurality of plates 34 attached to an inlet manifold 30 at a first joint 36. The plates 34 are also attached to an outlet manifold 32 at an outlet joint 40. Each of the joints 36 and 40 encounter mechanical stresses caused by uneven thermal gradients within each of the plate structure 34 caused by the differences in temperature between the cooling airflow 20 and the hot airflow 18. In this example, a high stress area indicated at 44 along with lower stresses throughout other areas create mechanical stresses that are most evident in the joints 36 and 40.

Each of the disclosed exemplary plates 12, 34 include features to reduce the thermal gradients relative to the high stress locations to reduce mechanical stresses. It should be appreciated that although joints are shown and described by way of example that other high stress locations and interfaces are within the contemplation of this disclosure.

Referring to FIGS. 3, 4, 5, and 6 each of the exemplary plates 12, 34 include inner passages 46 with inner surfaces that are disposed in heat transfer communication with adjacent outer surfaces. In this disclosure heat transfer communication is used to describe opposing surfaces of a common wall, or adjacent wall through which thermal energy is transferred.

In each of the plates 12, 34 the inner passages 46 are separated from the outer surface 48 by a common wall. The inner surfaces defined by the passages 46 are exposed to hot flow 18 and the outer surface 48 is exposed to cooling airflow 20. In this example embodiment, each of the passages 46 include heat augmentation features 50. The augmentation features 50 vary the passage flow area and thus improve thermal transfer between the hot and cold flows by changing flow rates/velocity and by tailoring flow rates to further enhance thermal transfer.

The augmentation features 50 are arranged in locations for a defined area to tailor thermal transfer to minimize mechanical stresses. Variation of heat augmentation location of the augmentation features 50 in the passages 46 enable tailoring of thermal transfer and thereby enable adjustment of thermal gradients to reduce stresses on a joint.

Figure 5:
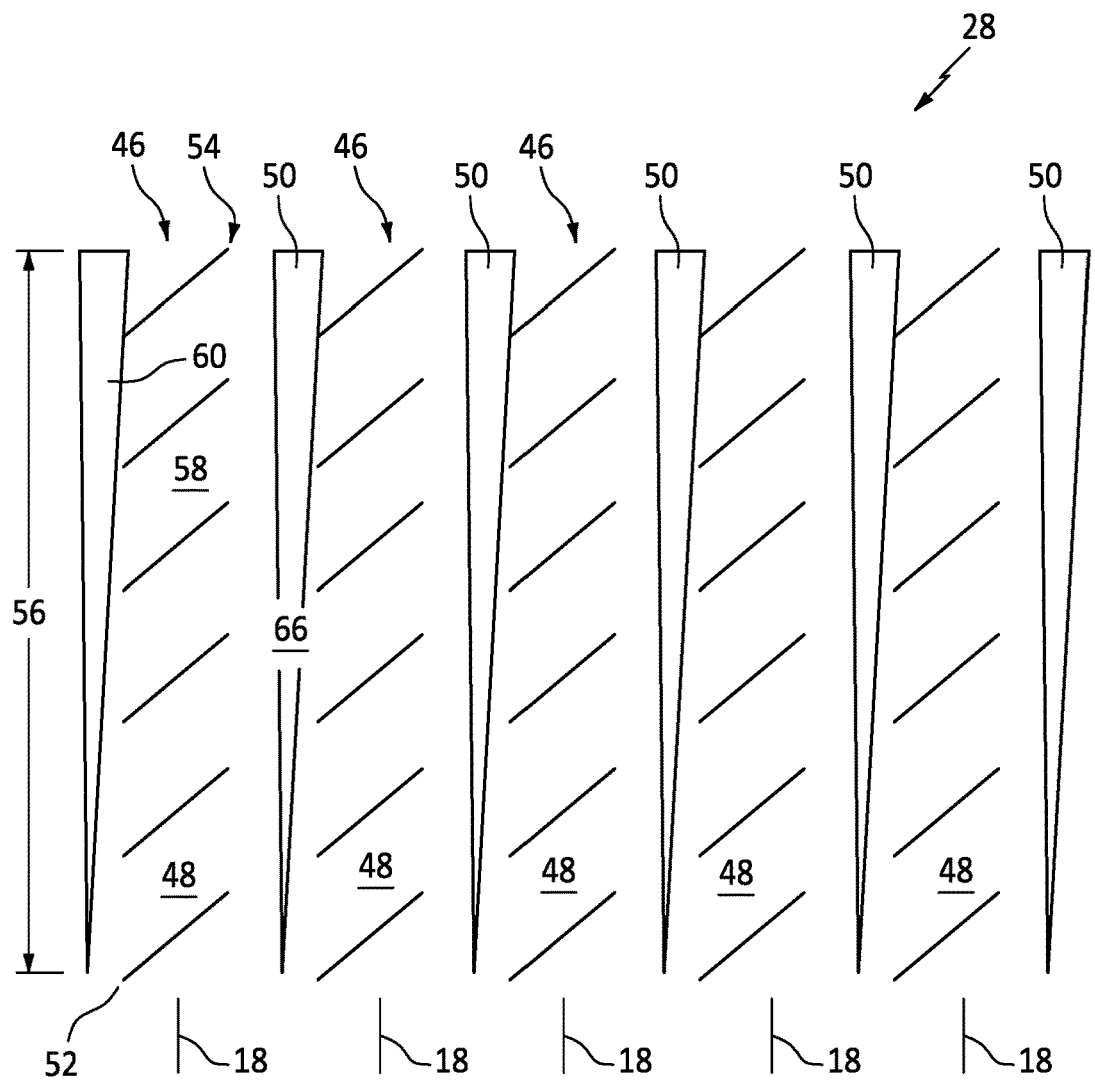
FIG. 5 a schematic of an exemplary heat exchanger with flow area modified to provide a more uniform heat transfer.
Figure 6:
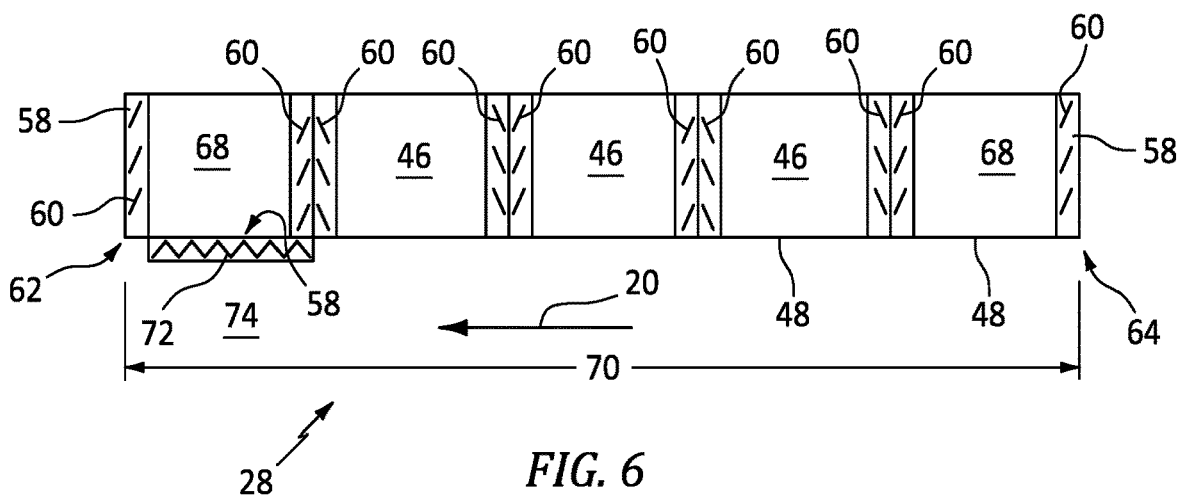
FIG. 6 a schematic cross-section of the exemplary heat exchanger of FIG. 5.

The internal passages 46 are schematically illustrated in FIG. 5 and FIG. 6 and include a group of augmentation features 50 that improve the transfer of thermal energy from the hot airflow 18 through the passage walls into the outer surface 48.

The passage 46 can define an internal passage 46 extending from a first inlet end 52 to a first outlet end 54. A first longitudinal length 56 can extend from the first inlet end 52 to the first outlet end 54. An inner surface 58 of the passage 46 can include a first augmentation feature 60 disposed along the first longitudinal length 56 proximate the inner surface 60. The outer surface 48 extends from a second inlet end 62 to a second outlet end 64. The outer surface 48 being in heat transfer communication with the inner surface 58. A first region 66 includes portions of both the inner surface 58 and the outer surface 48 adjacent at least a portion of the first inlet end 52. The first augmentation feature 60 varies a cross-sectional area 68 in a direction along the first longitudinal length 56 and within the first region 66.

A second longitudinal length 70 can be disposed transverse to the first longitudinal length 56 and extend from the second inlet end 62 to the second outlet end 64. A second augmentation feature 72 can be disposed transverse to the first augmentation feature 60.

The number and/or shape of augmentation features 50 within the passages 46 can be varied throughout the heat exchanger assembly 28. It should be understood, that variation in the number and location of augmentation features is disclosed by way of example, but any difference in number, structure, shape of the augmentation features 50 that changes the thermal transfer capability through the adjoining wall could be utilized and is within the contemplation of this disclosure.

The flow passages 46 are modified by changing the cross-sectional area configured to accelerate the working fluid 18 as it passes through the heat exchanger 28. Increasing the flow velocity of the working fluid 18 through the flow passage drives higher heat transfer coefficient values. Thus, in this embodiment, the flow area can be tailored to modify flow velocities and influence the heat transfer coefficients across the entire heat exchanger 28. It is contemplated that the cross-sectional flow area can be modified for flow passages on either the hot airflow 18 and/or the cooling airflow 20 passages.

The augmentation feature 50 can be created by increasing the wall thickness along a portion of the passage 46. In an exemplary embodiment, the augmentation feature 50 can include the addition of wall inserts that change the cross-sectional flow area of the passage 46. In an exemplary embodiment, use of additional material along the length of the passage 46 can be employed. The augmentation feature 50 can be located at various distances along the length of the passage 46. In an exemplary embodiment, either of the walls in the flow passage can be modified to change the cross-sectional flow area.

A cross-sectional area 74 formed by the second augmentation feature 72 can be greater than or less than or equal to the cross-sectional area 68 formed by the first augmentation feature 60.

In an exemplary embodiment, the first augmentation feature 60 extends along the entire first longitudinal length 56. Alternatively, the first augmentation feature 60 can extend along a portion of the first longitudinal length 56. In an exemplary embodiment, the second augmentation feature 72 can extend along the entire second longitudinal length 70. Alternatively, the second augmentation feature 72 can extend along a portion of the second longitudinal length 70.

By tailoring the entire heat exchanger flow passages by use of strategic placement of the varied cross-sectional flow area, the overall heat transfer coefficient can be more uniformly controlled. The effect of a more uniform heat transfer coefficient reduces the thermal stresses on the heat exchanger structure.

A technical advantage of the disclosed heat exchanger includes the improved heat exchanger heat transfer coefficient profile that is more uniform across the entire heat exchanger.

Another technical advantage of the disclosed heat exchanger includes flow passages are modified by changing the cross-sectional area configured to accelerate the working fluid as it passes through the heat exchanger.

Another technical advantage of the disclosed heat exchanger includes increasing the flow velocity of the working fluid through the flow passage in order to drive higher heat transfer coefficient values in strategic locations.

Another technical advantage of the disclosed heat exchanger includes tailoring the flow area to modify flow velocities and influence the heat transfer coefficients across the entire heat exchanger.

Another technical advantage of the disclosed heat exchanger includes tailoring the heat exchanger surfaces by use of strategic placement of flow area to more uniformly control the heat transfer. The effect of a more uniform heat transfer reduces the thermal stresses on the heat exchanger structure.

It should be appreciated, that although several exemplary augmentation feature structures have been disclosed by way of example, that other shapes, sizes and relative orientations could also be utilized and are within the contemplation of this disclosure.

The exemplary disclosed augmentation features formed as integral portions of surfaces of each of the plates on both the inner and outer surfaces in a targeted manner to tailor thermal gradients to reduce thermal stresses relative to interfaces and joints.

There has been provided a heat exchanger. While the heat exchanger has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:
1. A heat exchanger comprising:
an internal passage extending from a first inlet end to a first outlet end;
a first longitudinal length extending from the first inlet end to the first outlet end;
an inner surface of the passage including a first augmentation feature disposed along the first longitudinal length across a full height of the inner surface wherein the first augmentation feature extends along the entire first longitudinal length, wherein inner surface first augmentation feature comprises internal walls separating a plurality of passages for a hot flow;
an outer surface extending from a second inlet end to a second outlet end, the outer surface being in heat transfer communication with the inner surface; and
a first region including portions of both the inner surface and the outer surface adjacent at least a portion of the first inlet end, wherein the first augmentation feature varies a cross-sectional area configured to accelerate a working fluid increasing a flow velocity of the working fluid passing through the heat exchanger in a direction along the entire first longitudinal length and within the first region, wherein the first augmentation feature comprises wall inserts that change the cross-sectional area of the passage within the first region.

2. The heat exchanger according to claim 1, further comprising:
a second longitudinal length disposed transverse to the first longitudinal length and extending from the second inlet end to the second outlet end; a second augmentation feature disposed transverse to the first augmentation feature.

3. The heat exchanger according to claim 2, wherein the cross-sectional area formed by the second augmentation feature is one of greater than or less than or equal to the cross-sectional area formed by the first augmentation feature.

4. The heat exchanger according to claim 1, wherein the outer surface is disposed to provide for exposure to a cooling flow and the inner surface is disposed to provide for exposure to a hot flow.

5. The heat exchanger according to claim 1, wherein the first augmentation feature extends along a portion of the first longitudinal length.

6. The heat exchanger according to claim 2, wherein the second augmentation feature extends along the entire second longitudinal length.

7. The heat exchanger according to claim 1, wherein the first augmentation feature extends along a portion of the first longitudinal length.

8. The heat exchanger according to claim 1, wherein the first region is disposed adjacent a joint between a plate heat exchanger and a manifold.

9. The heat exchanger according to claim 2, wherein the second augmentation feature is formed as an integral part of the outer surface.

10. A process for controlling the thermal expansion of a heat exchanger comprising:
extending an internal passage from a first inlet end to a first outlet end;
extending a first longitudinal length from the first inlet end to the first outlet end;
disposing a first augmentation feature along the first longitudinal length across a full height of an inner surface of the passage wherein the first augmentation feature extends along the entire first longitudinal length;
forming an outer surface extending from a second inlet end to a second outlet end, the outer surface being in heat transfer communication with the inner surface;
forming a first region including portions of both the inner surface and the outer surface adjacent at least a portion of the first inlet end, disposing the first region adjacent a joint between a plate heat exchanger and a manifold; and
varying a cross-sectional area configured to accelerate a working fluid increasing a flow velocity of the working fluid passing through the heat exchanger in a direction along the entire first longitudinal length and within the first region by use of the first augmentation feature.

11. The process of claim 10, further comprising:
forming a second longitudinal length transverse to the first longitudinal length and extending from the second inlet end to the second outlet end; and
disposing a second augmentation feature transverse to the first augmentation feature.

12. The process of claim 11, wherein the cross-sectional area formed by the second augmentation feature is one of greater than or less than or equal to the cross-sectional area formed by the first augmentation feature.

13. The process of claim 10, further comprising:
exposing the outer surface to a cooling flow and the inner surface to a hot flow.

14. The process of claim 10, further comprising:
forming the first augmentation feature as an integral part of the inner surface.

* * * * *